United States Patent [19]
Guarino

[11] Patent Number: 5,827,554
[45] Date of Patent: Oct. 27, 1998

[54] FLAT PACK VACUUM PACKED SEAFOOD PACKAGE AND PROCESS FOR PRODUCING MICROWAVEABLE SHRIMP

[75] Inventor: Nicholas A. Guarino, Roatan, Honduras

[73] Assignee: Carnival Brand Seafood Company, Fort Lauderdale, Fla.

[21] Appl. No.: 746,161

[22] Filed: Nov. 6, 1996

Related U.S. Application Data

[63] Continuation-in-part of Ser. No. 637,610, Apr. 25, 1996.

[51] Int. Cl.$^6$ .................................................. B65B 29/08
[52] U.S. Cl. ........................... 426/107; 426/113; 426/124; 426/129; 426/234; 426/393; 426/396; 426/412; 53/434; 53/449; 206/778
[58] Field of Search ................................ 426/107, 234, 426/129, 412, 124, 113, 114, 393, 396; 53/434, 449, 444, 445; 206/778, 784

[56] References Cited

U.S. PATENT DOCUMENTS

| | | | |
|---|---|---|---|
| 2,674,536 | 4/1954 | Fisher | 426/114 |
| 2,776,215 | 1/1957 | Thomas | 426/396 |
| 2,776,216 | 1/1957 | Thomas | 426/396 |
| 2,850,391 | 9/1958 | Gunsberg | 426/113 |
| 2,920,968 | 1/1960 | Grandy | 426/129 |
| 3,012,894 | 12/1961 | Nagel | 426/113 |
| 3,152,915 | 10/1964 | Cover et al. | 426/393 |
| 3,271,169 | 9/1966 | Baker et al. | 426/114 |
| 3,587,839 | 6/1971 | Von Brecnt | 426/129 |
| 3,692,545 | 9/1972 | Moore | 426/129 |
| 3,780,196 | 12/1973 | Domecki | 426/393 |
| 3,864,503 | 2/1975 | Steenolsen | 426/412 |
| 3,895,120 | 7/1975 | Backus | 426/129 |
| 3,912,823 | 10/1975 | Kane | 426/129 |
| 4,081,646 | 3/1978 | Goltsos | 426/107 |
| 4,133,896 | 1/1979 | Standing et al. | 426/113 |
| 4,141,487 | 2/1979 | Faust et al. | 426/113 |
| 4,230,729 | 10/1980 | Hoelzel | 426/129 |
| 4,425,368 | 1/1984 | Watkins . | |
| 4,456,164 | 6/1984 | Foster et al. . | |
| 4,529,089 | 7/1985 | Gasbarra et al. | 426/113 |
| 4,571,337 | 2/1986 | Cage et al. . | |
| 4,798,728 | 1/1989 | Sugisawa et al. | 426/129 |
| 4,801,077 | 1/1989 | Sweat et al. | 229/125.19 |
| 4,835,942 | 6/1989 | Skrmetta | 426/107 |
| 4,839,180 | 6/1989 | Standerwick et al. . | |
| 4,857,342 | 8/1989 | Kappes | 426/113 |
| 4,862,791 | 9/1989 | Baughey | 426/113 |
| 4,873,101 | 10/1989 | Larson et al. . | |
| 4,898,743 | 2/1990 | Ross et al. | 426/113 |

(List continued on next page.)

FOREIGN PATENT DOCUMENTS

| | | | |
|---|---|---|---|
| 479968 | 1/1952 | Canada | 426/107 |
| 374071 | 6/1990 | European Pat. Off. | 426/129 |
| 1258357 | 2/1960 | France | 426/129 |
| 2483190 | 12/1981 | France | 426/129 |
| 58-98058 | 6/1983 | Japan | 426/129 |
| 60-234539 | 5/1984 | Japan | 426/129 |
| 59-106253 | 6/1984 | Japan | 426/129 |
| 62-244340 | 10/1987 | Japan | 426/113 |
| 63-254964 | 10/1988 | Japan | 426/113 |
| 63-283558 | 11/1988 | Japan | 426/393 |
| 2-60579 | 3/1990 | Japan | 426/234 |
| 6-78720 | 3/1994 | Japan | 426/412 |
| 2199235 | 7/1968 | United Kingdom | 426/113 |
| 2121752 | 1/1984 | United Kingdom | 426/412 |

OTHER PUBLICATIONS

Modern Packaging Jan. 1955 pp. 79, 160, 162 4261129.

*Primary Examiner*—Steven Weinstein
*Attorney, Agent, or Firm*—Quarles & Brady

[57] ABSTRACT

Packaging for shellfish and other seafood in which the product may be microwaved, including the use of pallet structure for positioning the product within the packaging to avoid penetration by shells, fish bones or fins of the plastic wrapping film to enable the product to be preserved by flat packing and vacuum sealing to be subsequently microwaved without rupture of the packaging until intentionally done at the completion of microwaving.

33 Claims, 3 Drawing Sheets

U.S. PATENT DOCUMENTS

| | | |
|---|---|---|
| 4,933,526 | 6/1990 | Fisher et al. . |
| 4,948,605 | 8/1990 | Lambert, Jr. . |
| 4,954,356 | 9/1990 | Kappes . |
| 4,964,507 | 10/1990 | Chen ........................................ 426/129 |
| 5,044,777 | 9/1991 | Watkins et al. . |
| 5,085,879 | 2/1992 | Elbaz ....................................... 426/129 |
| 5,164,211 | 11/1992 | Comer ..................................... 426/129 |
| 5,247,149 | 9/1993 | Peleg . |
| 5,256,434 | 10/1993 | Conway ................................... 426/129 |
| 5,345,069 | 9/1994 | Grindrod . |
| 5,377,855 | 1/1995 | Cook et al. .............................. 426/129 |
| 5,431,938 | 7/1995 | Kou . |
| 5,457,939 | 10/1995 | Bardou . |
| 5,473,866 | 12/1995 | Maglecic et al. . |

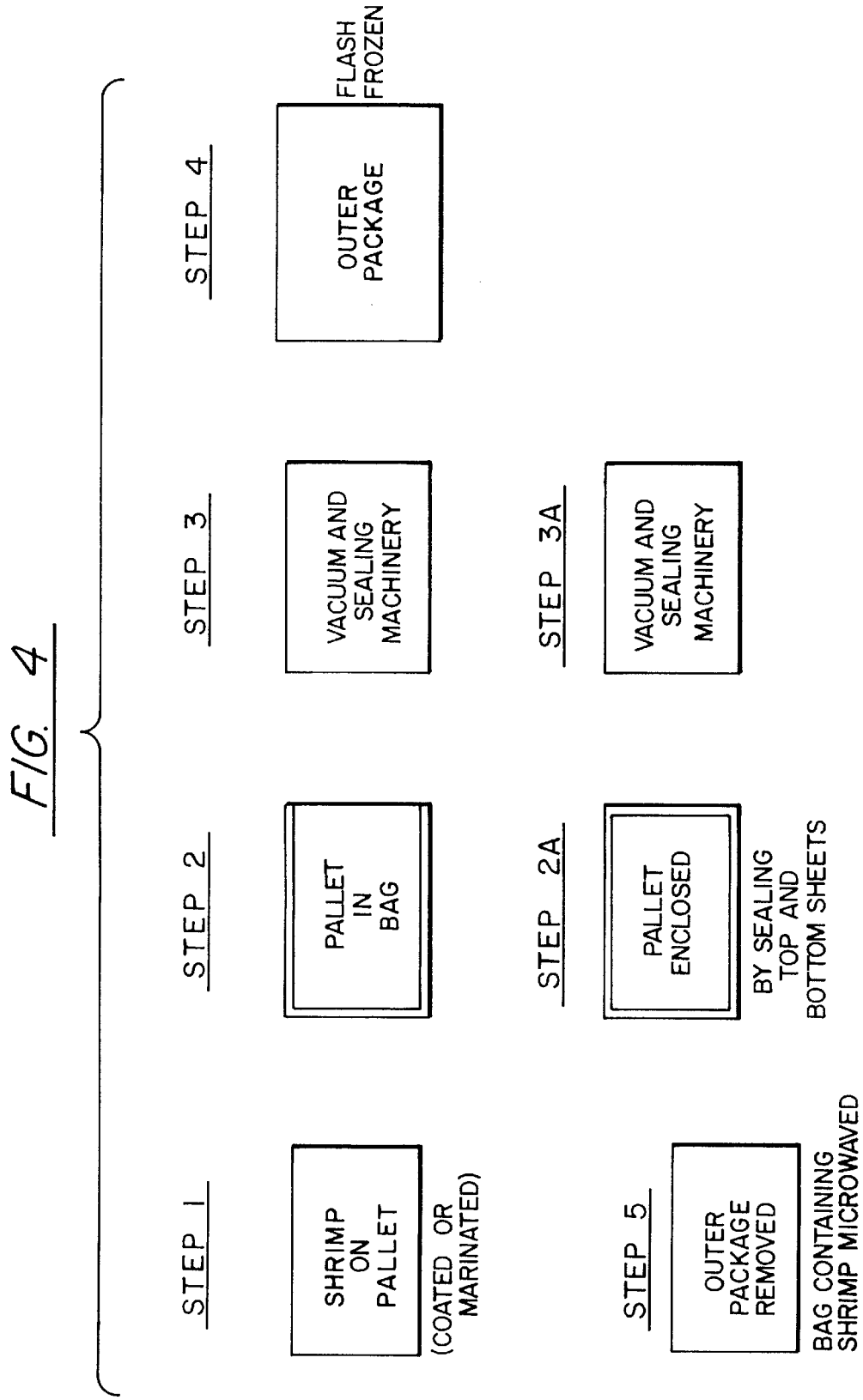

FLAT PACK VACUUM PACKED SEAFOOD PACKAGE AND PROCESS FOR PRODUCING MICROWAVEABLE SHRIMP

CROSS-REFERENCE TO RELATED APPLICATION

This application is a continuation-in-part of U.S. Ser. No. 08/637,610, filed Apr. 25, 1996.

BACKGROUND OF THE INVENTION

Heretofore, packaging of shellfish in buyer-friendly containers having a good visibility of the product has been limited as the shells of the product were known to penetrate clear packaging, making it inappropriate to vacuum seal the product in marketable flat packaging for retail use. Further, such prior packaging could not be used successfully for microwaving the product in the same container as packaged.

With vacuum packaging of any seafood product, there is also significant concern with the potential of mold, yeast, bacteria, especially botulism. Prior to the development at hand, seafood companies have stayed away from attempting to produce a product comparable to that disclosed within. Processes have been tried before to eliminate the threat of botulism. Examples of such processes are nitrogen flushing and radiation. Notwithstanding these attempts, success has not previously been obtainable, primarily because of problems associated with the integrity of the packaging leading to health issues such as botulism.

While vacuum sealing has been successfully used for packaging shellfish without the shells and other fish in bulk, flat packing shell-on shrimp and other seafood in vacuum sealed containers suitable for retail has not been successfully done, explaining the absence of the use of such packaging in the marketplace. Further, with prior packaging, the packaged product has not been suitable for microwaving the product directly in its shipping and sales package. While vacuum packaging has been used for a variety of vegetables and meats, this usage has not extended successfully to retail packaging of shrimp and other seafood. An example of vacuum packaging technique of food stuffs is found in U.S. Pat. No. 5,473,866.

A seafood vacuum-pack system is disclosed in U.S. Pat. No. 4,835,942 but this patent teaches away from the subject invention in that shrimp are intentionally stacked one above the other at the periphery of the packages. Likewise, U.S. Pat. No. 4,964,507 teaches the use of a "protruding-up curved section" of a case which is also contrary to the subject invention.

SUMMERY OF THE INVENTION

Accordingly, the subject invention is directed to packaging which permits the vacuum packaging of shellfish, such as shrimp, to enable the packaged product to be presented to consumers in attractive packaging while maintaining the integrity of the vacuum packaging to provide a better packaged product than in the past and one which can be successfully microwaved without removing the product. For aesthetic, packaging, and microwaving reasons, the shrimp or other fish are packed in a flat, carefully presented orientation which enables the product to be successfully packed in the first instance, and subsequently microwaved without removal until completion of the microwaving at which time the package is for the first time ruptured and the contents are removed. While some prior patents disclose various designs which promote venting of the package desiring microwaving, the subject package maintains its integrity until the microwaving is completed, at which time the package is ruptured for the first time.

It is therefore an object of the subject invention to provide a vacuum packaging process and the packaging to enable shellfish with sharp shell-like features to be safely packaged, and subsequently microwaved in the same package.

It is a further object of the subject invention to provide a process and packaging to present shellfish to the consumer in retail packaging heretofore unknown to the consumer, which packaging then forms a container for microwaving the product, which container remains sealed until the microwave process is completed.

It is a related object to provide a process by which seafood is flat packed, flash frozen, and distributed, to be subsequently microwaved in the same container by the purchaser.

It is still a further object of the subject invention to provide shrimp in desirable packaging to promote favorable product appearance and to facilitate utilitarian objectives, including the ability to microwave the product within the same packaging.

It is one more object of the subject invention to develop a packaging process whereby concerns of spoilage, botulism, mold, yeast, and bacteria are effectively minimized and to maintain the product in ready condition for microwaving at a moment's notice at any time.

It is still another object of the subject invention to provide a process and packaging of shrimp in a cost efficient manner wherein the package itself becomes a container for microwaving.

It is one more object of the subject invention to provide a process and packaging to permit the packaging of shellfish so as they can be carefully inspected by the consumer upon purchase.

In compliance with the above objects, shellfish are vacuum packed as follows. If the product to be packed is shell-on or head-on shrimp, the shrimp are placed on a pallet in a basically flat orientation. It is critical that this flat orientation be maintained, because otherwise the shrimp, if they become twisted or bunched, are likely to penetrate the packaging, breaking the vacuum seal, which will have a detrimental effect on the condition of the product.

In the preferred embodiment, a pallet of very specific design is used. One side of the pallet is matted or rough so as to help secure the shrimp in flat orientation and retard sliding or bunching of the shrimp. The other side of the pallet is smooth so as to facilitate the handling and in particular the packaging, as the pallet can be easily slid into a bag or otherwise positioned prior to the step of vacuum sealing the product. The matted or roughed side of the pallet may also be coated with a reflective material which promotes microwaving but which is not so reflective that it becomes detrimental to the microwaving process.

The pallet also may have raised sides which help to ensure that the shrimp will remain flat and well-orientated during the packaging process. The sides also help, as the vacuum sealing takes place so the shrimp along the sides are insulated from direct contact from the sides of the packaging to prevent puncturing, which can turn out to be a critical stressed area as the covering bag fits fairly tightly around the shrimp. It is necessary that the bag fit tightly to help hold the shrimp in flat orientation so they can be successfully microwaved.

Once the shrimp are placed on the pallet and the pallet is positioned within the bag of plastic film, the vacuum sealing can take place with somewhat standard and well-known equipment. Typically a vacuum means will draw a vacuum within the filled bag and a seal jaw assembly will heat seal the bag once the air is evacuated. The vacuum-heat sealing equipment is not part of the subject invention.

The sealed bag with shrimp contained within can then be placed in an outer package, preferably of cardboard, which will stabilize the bag within and help to hold the shrimp in a flat orientation. The outer package is designed for retail acceptance and will likely include a window so that the shrimp may be examined within the inner package. This outer package will be removed when microwaving takes place.

On the other hand, the shrimp may be marketed in the sealed bag without the outer package. Sales information can be placed on the bottom of the pallet, which will be seen through the bag material which will be transparent, or on the bag itself.

Regardless of the use or not of the outer package during the packing process, the shrimp are placed on the pallet in a non-frozen state and upon being packed as disclosed herein, are immediately flash frozen, using any of several commercial techniques, such as, but not limited to, blast freezing, contact freezing or tunnel freezing, and marketed in such frozen state.

It is contemplated that the packaged shrimp remain in a frozen state through distribution, retail, etc. until approximate time of consumption. The packaged shrimp can then be placed in a microwave unit. The bag or package had been designed to retain its integrity through the microwaving process and will not rupture during the process. As the frozen product is thawed, the resulting locked in moisture will provide the basis for steaming the shrimp within the bag or package to then be removed by rupturing the bag and served for consumption.

BRIEF DESCRIPTION OF THE DRAWINGS

FIG. 4 shows the steps of the process by which seafood is packaged and subsequently microwaved according to the steps of the subject invention.

DETAILED SPECIFICATIONS

Figure 1:
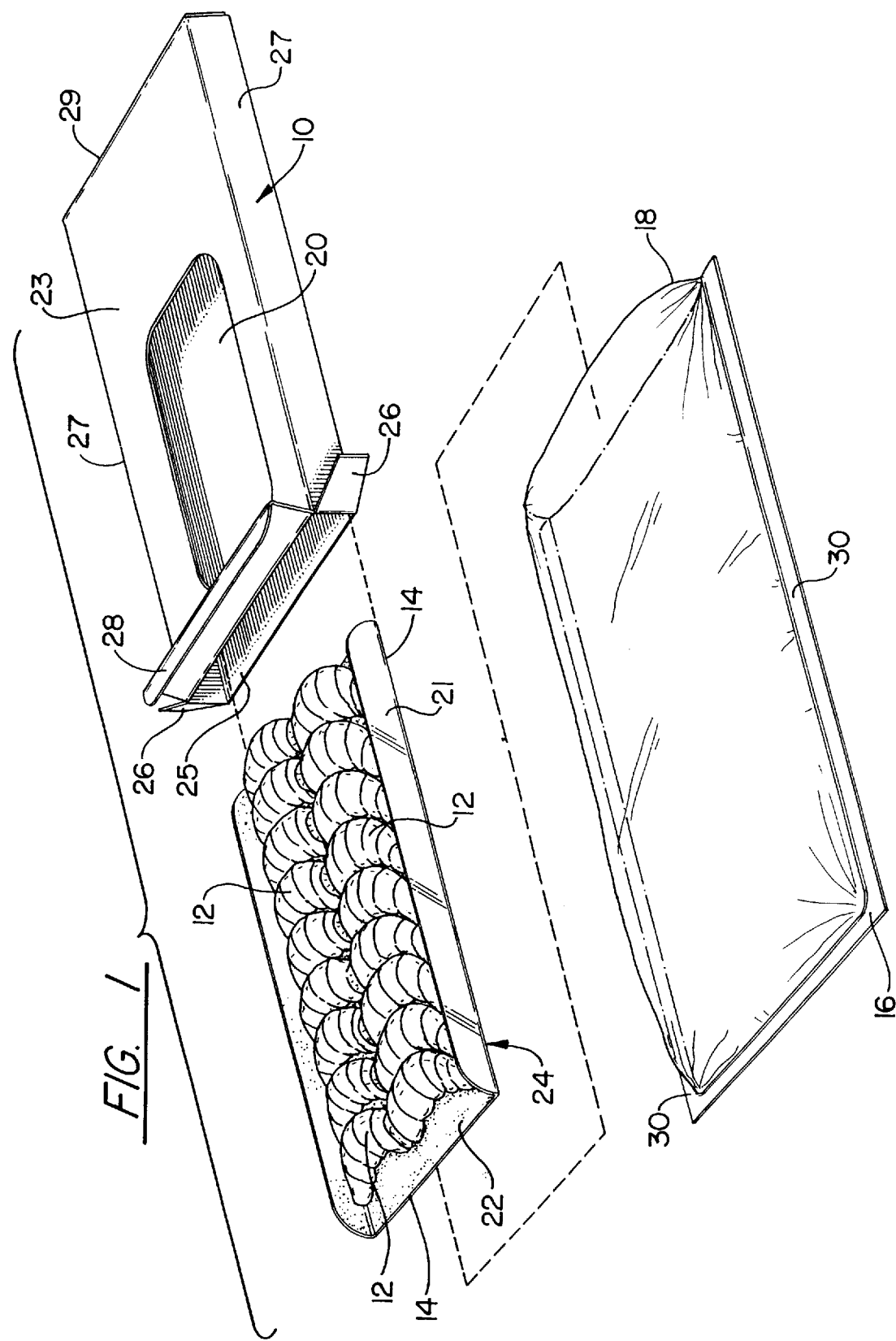
FIG. 1. is a sequential perspective view showing seafood, in this case shrimp on a pallet, the inner packaging to cover and seal the shrimp and the outer container to receive the packaged shrimp.

For a shellfish product, as for example shrimp, to be packaged in the package 10 as shown in FIG. 1, shrimp 12 are first carefully positioned on a pallet 14 in flat orientation as shown. The pallet,14 will then be inserted into the transparent envelope of packaging 16 as shown and slid within, at which time vacuum will be applied and the envelope or bag-like container 16 will be sealed by the processing equipment. More specifically, a vacuum is created as vacuum means (not shown) causes the air to be sucked from within prior to the sealing of the end 18 of bag 16 as is standard in vacuum packaging of food stuffs. The shrimp 12 typically will be without heads but packed with tails and within the shell.

The envelope or bag 16 containing the product (shrimp 12) is now ready to be placed within the outer package or container 10, having window or opening 20 for inspection of the shrimp 12.

It is important for salability that the shrimp 12 be packaged with the shells on and that the pallet 14 maintains alignment of the shrimp 12 to prevent penetration of the envelope 16 by sharp edges of the shells. Also, the shrimp 12 need to maintain a flat orientation to be subsequently successfully microwaved which is an important aspect of the present invention. Specifically, the pallet 14 may be constructed of plastic with some rigidity that enables the shrimp 12 to be positioned so there is no turning, sliding, twisting, bunching or other disorientation of the shrimp 12 that would bring sharp shell edges into contact with the protective film or envelope 16. If the envelope 16 is punctured, storage problems can result and the ability to subsequently microwave the product in its bag 16 will be compromised as well. The bag 16 may be of 2-ply construction comprised of polypropylene and nylon, with the polypropylene enabling it to tolerate temperature extremes and the nylon contributing to its strength. Equivalent material may also be used.

Also, as shown in FIG. 1, the pallet 14 may have side structure 21 which will help to keep the desired orientation of the shrimp 12 and help to prevent puncturing of the envelope 16. In particular, as the package, envelope or bag 16 is sealed and then inserted into nonsealed outer package 10, stress points might exist along its sides and the pallet side structure 21 helps to protect the bag seal by acting as a buffer between the tails of the shrimp 12 and the sides of bag 16. The bag seal across the top is very tight to the shrimp 12, to hold them in a flat orientation which will be critical for the microwaving step that may subsequently follow.

Upon further examination of FIG. 1, the pallet 14 will be seen to have two very different surfaces. The top surface 22 on to which the shrimp 12 will be positioned, is matted or roughened to also prevent the shrimp 12 from sliding and becoming disoriented which will interfere with the need to have the shrimp 12 flat packed for appearance, to prevent the penetration of the plastic film structure of envelope 12 and to provide suitable orientation of the product for microwaving.

The top surface 22 may also be coated with a reflective coating to facilitate microwaving once the envelope 16 is inserted into a microwave unit prior to consumption. The coating, thanks to the roughness of the surface, will not be a detriment to microwave as the waves will not be directed back to the microwave source due to the roughness which creates something less than direct reflection. The coating can be a reflective foil which may be gold in color.

The bottom surface 24 is smooth, as best seen on the sides 21 which are turned up at an approximate 90 degree angle. The smoothness facilitates the handling of the pallet 14 and, in particular, the sliding of the pallet 14 within envelope 16 prior to the vacuum sealing of the envelope by sealing edge or end 18.

As can further be seen in FIG. 1, once the shrimp 12, on pallet 14, are placed within bag 16 and sealed, the bag 16 is placed within outer package or container 10, which is preferably made of cardboard or substitute. The container or cardboard box 10 basically has a top 23 and bottom 25 portion, sides 27, and ends 29. The opening 20 in top portion 23 is cut in such a way to enable the product within to be viewed.

Once the bag or package 16 is placed within outer package or container 10 the container 10 is closed by tucking in side flaps 26 and end flap 28.

Figure 2:
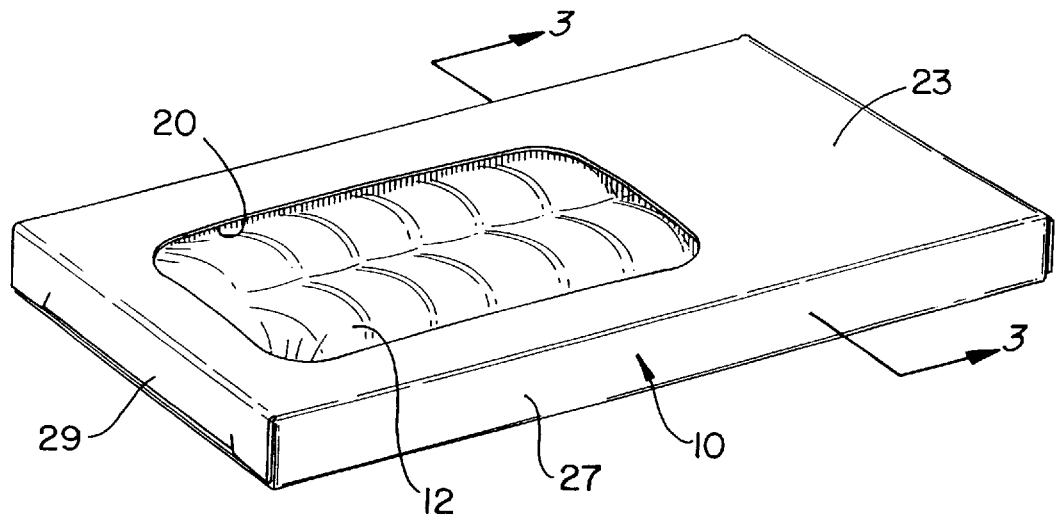
FIG. 2 is a perspective view showing packaged shrimp following the teachings of the subject invention.

As can be seen in FIG. 2, packaged shrimp 12 may be viewed through opening 20 as the flat packed frozen shrimp are presented for sale in commercial establishments such as grocery chains. The packages 10 will typically be stacked within freezer compartments to present an attractive product for the purchasers.

Figure 3:
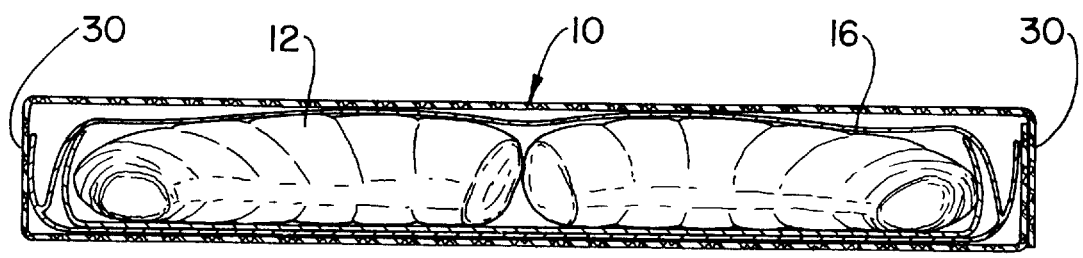
FIG. 3 is a cross sectional view taken along the lines 3—3 of FIG. 2.

With reference to FIG. 3, the packaged shrimp 12 are seen within package or bag 16, which in turn is within outer package 10. Sealed edges 30 of the bag 16 can be seen tucked so as to fit snugly within the outer package 10. The sides 21 of pallet 14 are shown serving as a buffer between sides of bag 16 and the shrimp 12, particularly the outer shrimp shell and jagged tail structure. It is contemplated that the outer package 10 will remain in place, which serves to protect the integrity of the bag or package 16 until time for microwaving, at which time it will be removed.

With reference to FIG. 4, the key steps of the process from packing to microwaving are presented. In Step 1, the shrimp 12 are placed on the pallet which may be substantially like pallet 14 of FIG. 1 except without sides 21. The shrimp 12 may be placed on pallet 14 by hand, machine (not shown), or by a combination of both. It is important that they lie flat and as part of the process, it is contemplated that downward pressure may be asserted on them to achieve a perfectly flat orientation. The risk of the shrimp shells or tail structure penetrating the envelope 16 is increased if the flat orientation is lost. The flat orientation means effectively that the shrimp 12 are lying on their sides in a somewhat natural curled position so they can be placed in close alignment one to another.

The pallet 14 is then to be enveloped into bag 16 as shown in Step 2. If three sides of the bag are sealed already, as shown in Step 2 and in FIG. 1, the pallet 14 is pushed into the bag 16 as facilitated by the smooth surface 24 of the bottom of pallet 14. Either machine or a by-hand process may be used in placing the pallet 14 within the bag 16.

As shown in Alternative Step 2, the pallet 14 may be slid onto a bottom sheet of plastic film and another sheet placed on top. Either sheets extending from rolls or discrete sheets can be used. The edges of top and bottom sheets will be joined together and heat sealed simultaneously with the vacuuming of the then-formed bag as represented in Step 3A.

As contemplated in Step 3, machinery well-known in packaging food stuffs can be used to create a vacuum within bag 16, sealing edge 18 in the process.

Alternatively, as shown in Step 3A and discussed above, the top and bottom sheets can be sealed on four sides, preferably by a standard heat sealing process as part of the vacuum process.

The vacuum is applied before the four edges are sealed to create the vacuum packed shrimp within package or bag 16.

In Step 4 the sealed bag or package 16 is placed within box or outer package 10 and the flaps 26, 28 as shown in FIG. 1, closed to complete the packing process. Step 4 can be conducted by hand or by machine, with the latter process being undertaken by packing machinery well known in the food stuffs industry.

At this juncture the packaged shrimp is immediately subjected to flash freezing to preserve the quality and to prevent the formation of bacteria, mold, and yeast and botulism thus enabling the product to be shipped and sold in frozen form with greatly increased shelf life. Standard industry equipment is used such as to blast freeze, contact freeze or tunnel freeze the product.

It is contemplated that the shrimp 12 will remain frozen until approximate time of consumption. This typically will be through distribution, retail storage and home or restaurant storage. As shown in Step 5, the package, bag or envelope 16 is to be removed from the outer package 10 and placed in its sealed condition in a microwave unit. The shrimp 12 will be effectively steamed as the package or bag 16 is designed to withstand the pressure of the steaming process with the bag 16 effectively becoming a pressure cooker. The shrimp 12 will then be ready for consumption as the steam penetrates into the shrimp, effectively steaming the product. The length of time of microwaving depends on the characteristics of the microwave unit that is used. Generally, it is contemplated that time of microwaving will be from two to ten minutes with application of from 400 to 3,000 watts.

In an alternative embodiment, shrimp or other seafood can be marketed in the package or bag 16 without being placed within the outer container 10. Sales indicia and literature may be placed on the bottom of the pallet 14, or bag 16, or on a sales page inserted within the bag 16 or attached on the outside. In this embodiment with respect to microwaving in Step 5 (FIG. 4), there is of course no need to remove the package or bag 10 from the outer package 10 which does not exist.

Viewing the overall steps from packing to microwaving, the shrimp are vacuum packed in a negative pressure situation prior to flash freezing which does not effect the negative pressure within which the shrimp are packed. Subsequently, upon microwaving, the expanding steam turns the package or bag 16 effectively into a pressure vessel.

A variety of improvements and modifications to the packaging and process disclosed herein will be apparent. Accordingly, no limitation on the invention is intended by the foregoing description and drawings.

What is claimed is:

1. A process for packaging seafood, comprising the steps of:

placing seafood in a flat arrangement on a pallet;

sliding said palletized seafood into a bag to enclose the palletized seafood;

sealing a vacuum to the bag and the palletized seafood; and, sealing the bag and the enclosed palletized seafood under said vacuum, said vacuum sealed palletized seafood being microwavable; and, wherein said pallet has a rough upper surface sufficient to restrain movement of said seafood and a smooth under surface sufficient to facilitate entry of said pallet into said bag, said seafood being placed on said rough upper surface and the flat arrangement being such that the likelihood of the bag being penetrated or pierced by any parts of the seafood that is capable of doing so is diminished.

2. The process of claim 1, further comprising the step of flash freezing said vacuumized palletized seafood in said sealed bag.

3. The process of claim 2, further comprising the step of microwave cooking said seafood in said sealed bag, the sealed bag forming a pressure cooker without venting, such that moisture is retained within the sealed bag until the microwave cooking step is completed.

4. The process of claim 1, further comprising the step of placing the sealed bag within an outer carton, said sealed bag being adapted for removal from said outer carton prior to microwave cooking.

5. The process of claim 4, wherein said outer carton has an opening for viewing the seafood in the sealed bag.

6. A process for packaging seafood, comprising the steps of:

placing seafood on a pallet in a flat orientation;

placing the palletized seafood on a lower sheet of plastic film;

placing an upper sheet of plastic film so that the extremities of the lower and upper sheets extend beyond the perimeter of the pallet and contact one another; and, applying vacuum and sealing the upper and lower sheets to each other to seal the palletized seafood under vacuum between the sealed sheets, said vacuum sealed palletized seafood being microwavable; and, wherein said pallet has a rough upper surface sufficient to restrain movement of said seafood and a smooth under surface sufficient to facilitate sliding said pallet onto said lower sheet, said seafood being positioned in the flat orientation on said rough upper surface such that the likelihood of the sheets being penetrated or pierced by any part of the seafood that is capable of doing so is diminished.

7. The process of claim 6, further comprising the step of flash freezing said vacuum sealed palletized seafood in said sealed bag.

8. The process of claim 7, further comprising the step of microwave cooking said seafood in said sealed bag, the sealed bag forming a pressure cooker without venting, such that moisture is retained within the sealed bag until the microwave cooking step is completed.

9. The process of claim 6, further comprising the step of placing the sealed bag within an outer carton, said sealed bag being adapted for removal from said outer carton prior to microwave cooking.

10. The process of claim 9, wherein said sealed bag is placed within a carton having an opening for viewing the seafood in the sealed bag.

11. A process for packaging shrimp, comprising the steps of:

placing shrimp in a flat arrangement on a pallet;

sliding and palletizing shrimp into a bag to enclose the palletized shrimp;

applying a vacuum to the bag and palletized shrimp; and, sealing the bag and the enclosed palletized shrimp under said vacuum, said vacuum sealed palletized shrimp being microwavable; and, wherein said pallet has a rough upper surface sufficient to restrain movement of said lobster and a smooth under surface sufficient to facilitate entry of said pallet into said bag, said shrimp being placed on said rough upper surface and the flat orientation being such that the likelihood of the bag being penetrated or pierced by any part of the shrimp that is capable of doing so is diminished.

12. The process of claim 11, further comprising the step of flash freezing said vacuumized palletized shrimp in said sealed bag.

13. The process of claim 12, further comprising the step of microwave cooking said shrimp in said sealed bag, the sealed bag forming a pressure cooker without venting, such that moisture is retained within the sealed bag until the microwave cooking step is completed.

14. The process of claim 11, further comprising the step of placing the sealed bag within an outer carton, said sealed bag being adapted for removal from said outer carton prior to microwave cooking.

15. The process of claim 14, wherein said outer carton has an opening for viewing the shrimp in the sealed bag.

16. A process for packaging shrimp, comprising the steps of:

placing shrimp on a pallet in a flat orientation;

placing the palletized shrimp on a lower sheet of plastic film;

placing an upper sheet of plastic film so that the extremities of the lower and upper sheets extend beyond the perimeter of the pallet and contact one another; and, applying vacuum and sealing the upper and lower sheets to each other to seal the palletized shrimp under vacuum between the sealed sheets, said vacuum sealed palletized shrimp being microwavable; and, wherein said pallet has a rough upper surface sufficient to restrain movement of said shrimp and a smooth under surface sufficient to facilitate sliding said pallet onto said lower sheet, said shrimp being positioned in the flat orientation on said rough upper surface such that the likelihood of the sheets being penetrated or pierced by any part of the shrimp that is capable of doing so is diminished.

17. The process of claim 16, further comprising the step of flash freezing said vacuumized palletized shrimp in said sealed bag.

18. The process of claim 17, further comprising the step of microwave cooking said shrimp in said sealed bag, the sealed bag forming a pressure cooker without venting, such that moisture is retained within the sealed bag until the microwave cooking step is completed.

19. The process of claim 16, further comprising the step of placing the sealed bag within an outer carton, said sealed bag being adapted for removal from said outer carton prior to microwave cooking.

20. The process of claim 19, wherein said outer carton has an opening for viewing the shrimp in the sealed bag.

21. A vacuumized seafood package, comprising:

a pallet;

seafood positioned on said pallet in a flat orientation;

a sealed bag enclosing said palletized seafood under vacuum; and, an outer container enclosing said sealed bag, said sealed bag being adapted for removal from said outer container prior to microwave cooking, said vacuum sealed palletized seafood being microwavable; and, wherein said pallet has a rough upper surface sufficient to restrain movement of said seafood and a smooth under surface sufficient to facilitate sliding engagement of said pallet and said bag, said seafood being positioned on said rough upper surface and said flat orientation being such that the likelihood of the bag being penetrated or pierced by any part of the seafood that is capable of doing so is diminished.

22. The package of claim 21, wherein said microwavable bag is formed from a microwavable plastic bag having an opening through which the palletized seafood is inserted.

23. The package of claim 21, wherein said microwavable bag comprises:

a lower sheet of a plastic film onto which the palletized seafood is placed; and, an upper sheet of a plastic film placed over the palletized seafood so that the extremities of the lower and upper sheets extend beyond the perimeter of the pallet and sealably contact one another.

24. The package of claim 21, wherein said sealed microwaveable palletized seafood is flash frozen.

25. The package of claim 21, wherein said sealed bag is adapted for microwave cooking, said sealed bag forming a pressure cooker without venting during the microwave cooking, such that moisture is retained within the sealed bag until the microwave cooking is completed.

26. The package of claim 21, wherein the pallet further comprises upwardly extending sides.

27. The package of claim 21, wherein said outer container has an opening for viewing the seafood in the sealed bag.

28. The package of claim 21, wherein the rough upper surface of the pallet has a reflective characteristic.

29. The package of claim 21, wherein the rough upper surface of the pallet is covered with a reflective coating.

30. The package of claim 21, wherein the outer container is a cardboard box.

31. The package of claim 21, wherein said seafood is shrimp.

32. The package of claim 21, wherein the seafood is shell-on shrimp.

33. The package of claim 32, wherein the shell-on shrimp are in a shell-up orientation on the pallet.

* * * * *